Jan. 15, 1924.
J. H. REINEKE
REGULATION OF PRESSURE
Filed June 28, 1920
1,480,837
4 Sheets-Sheet 1
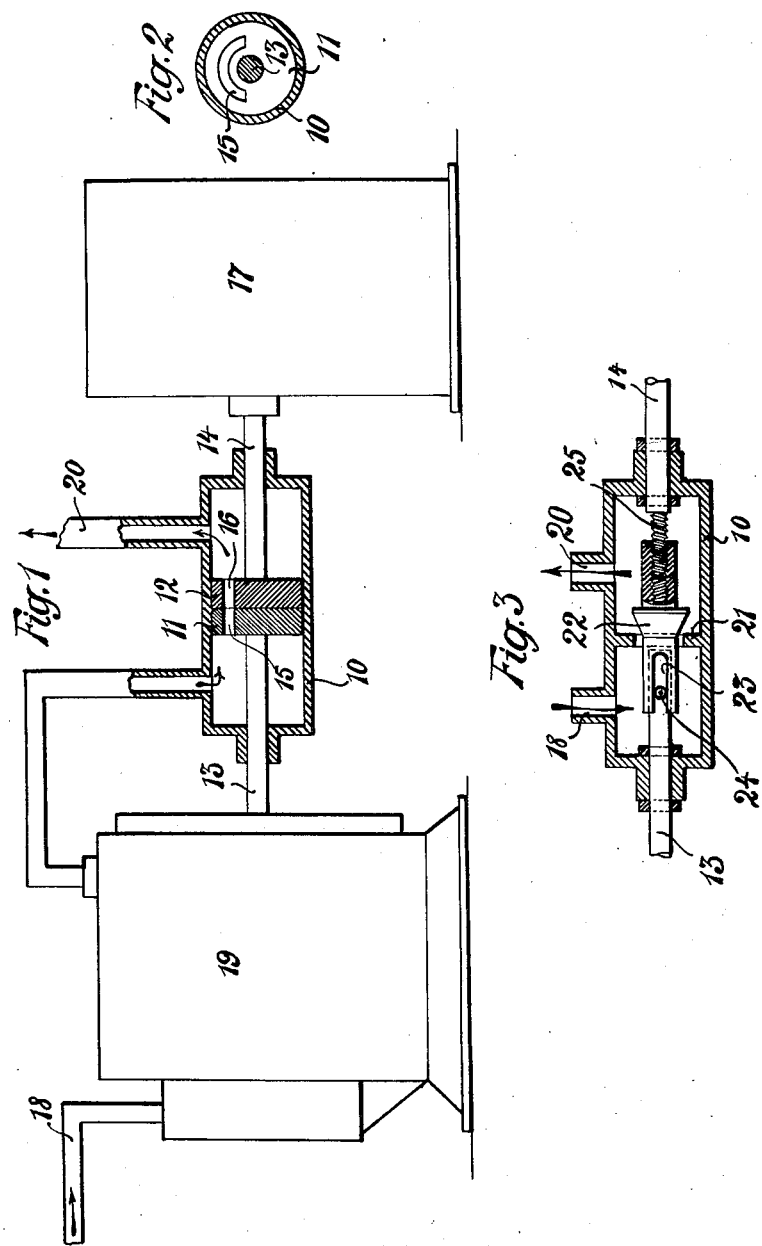
Inventor:
Joseph Heinr Reineke Jan. 15, 1924.
J. H. REINEKE
1,480,837
REGULATION OF PRESSURE
Filed June 28, 1920
4 Sheets-Sheet 2
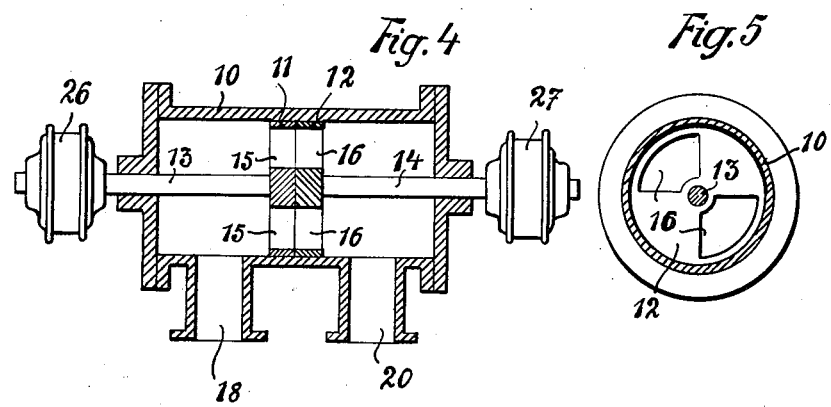
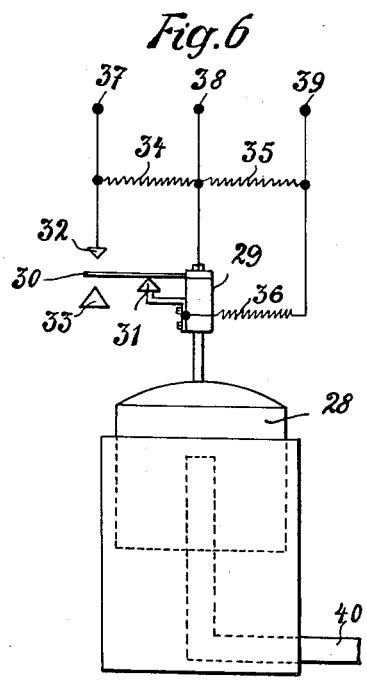
Inventor:
Josef Heinz Reineke

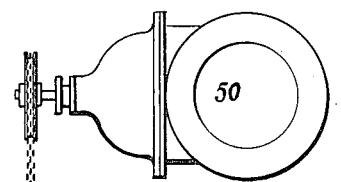
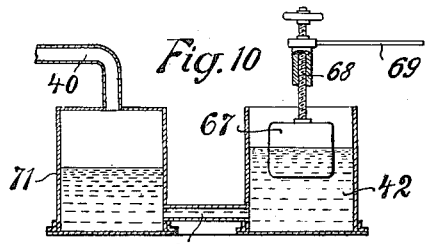
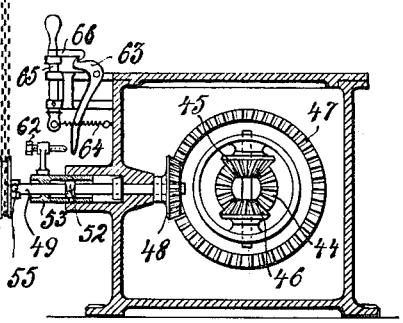
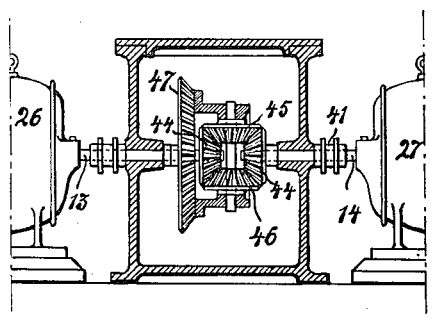
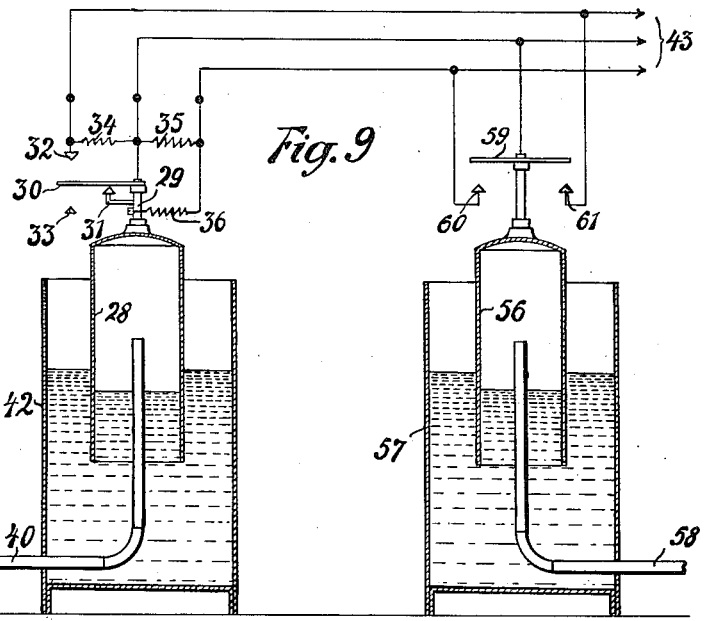

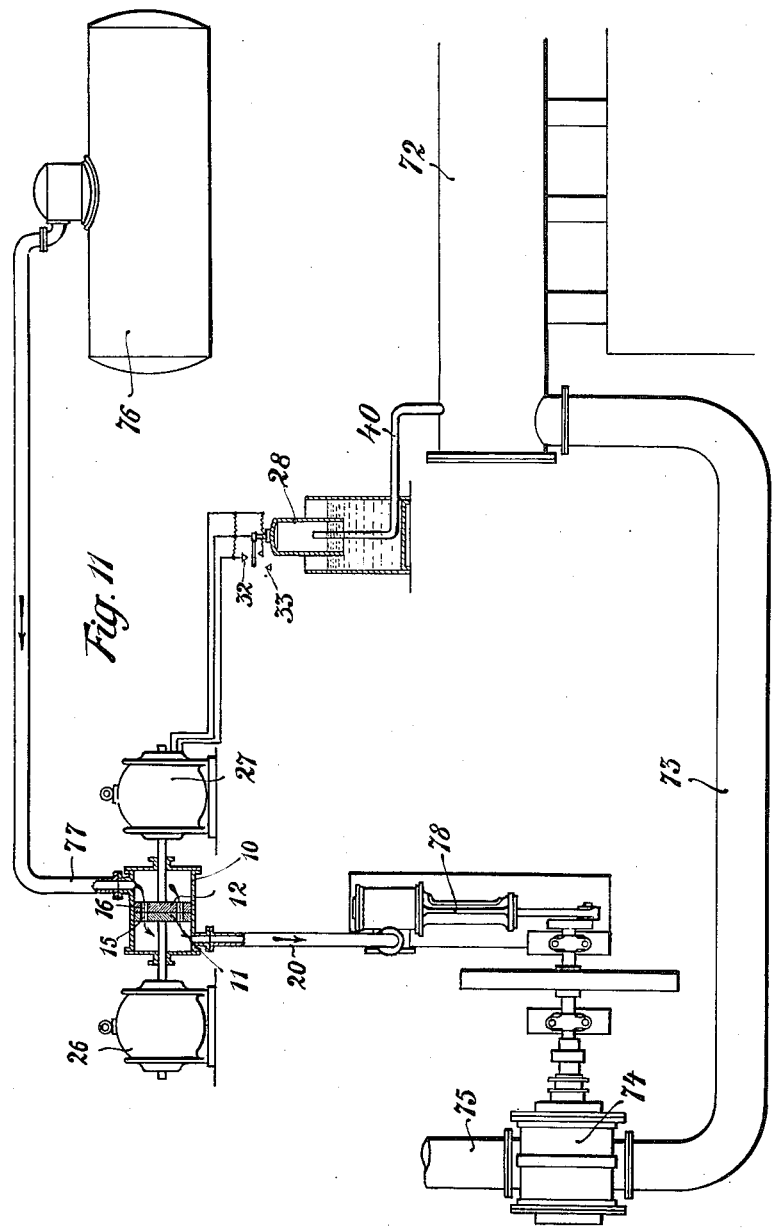

Patented Jan. 15, 1924.

1,480,837

UNITED STATES PATENT OFFICE.

JOSEF HEINZ REINEKE, OF BOCHUM, GERMANY.

REGULATION OF PRESSURE.

Application filed June 28, 1920. Serial No. 392,536.

*To all whom it may concern:*

Be it known that I, JOSEF HEINZ REINEKE, a citizen of the German Empire, residing at Bochum, Germany, have invented certain new and useful Improvements in the Regulation of Pressure, of which the following is a specification.

My invention relates to the automatic regulation of the pressure of gases and liquids, that is to say, to secure not only the accurate regulation of small quantities, such as are required for test purposes, but also—and in particular—of large quantities, such as are required in technical processes.

For the automatic control of gas pressures, there have hitherto been employed simple ordinary regulating devices wherever it was a question of nicely regulating small quantities of gas, such as are required in chemical laboratories and in measuring the illuminating power of gas-flames. These said regulating devices generally consist of a vessel filled with water in which a floating bulb together with a governor valve is arranged to oscillate, which bulb is forced upward to a greater or less extent according to the prevailing pressure, and which is adapted to throttle the passage of the gas or liquid to a larger or smaller degree by means of said valve. Now, while regulating devices of this kind are extremely simple in construction, they nevertheless involve considerable drawbacks. Thus for example, they are only enabled to balance relatively small fluctuations of pressure, and this always provided that the gas-pressure will always return to a certain average value. Now this is a contingency which very rarely occurs, say, in connection with mine gases, where the objectionable influence of the fluctuations of pressure, which are both constant and considerable, makes itself very keenly felt. A further drawback appertaining to these fluctuations of pressure resides in the fact of their being dependent on the specific gravity of the gas which for its part constantly varies. Nor will it make any essential difference if, in the place of a floating bulb, a diaphragm be employed.

Again, if regulating devices of the aforesaid type be used in connection with large quantities of gas, then the shutting-off devices will—in view of the far greater quantity of gas or liquid to be governed—obtain such dimensions and such a weight that in order to operate them satisfactorily there will be required very large bulbs and diaphragms. By these means, however, masses are inserted into the regulating device which by reason of their inertia will very powerfully impair its sensitiveness. and besides, owing to the reaction of the masses, will bring about an over-, or an undersensitive governing action which may even lead by means of resonance to an increase of the original oscillations. In cases of this kind, the attempt has been made to cause the work required for the governing action to be carried out not by the gas itself, but by a motor. In such an event the gas pressure will control the direction of rotation of the motor by means of an electrical, or, in the event that said direction of rotation is to remain unaltered, by means of a mechanical reversing device with reversing gear. However, there will in such contingencies arise a phenomenon, entirely corresponding to the aforesaid reaction of masses, in the shape of a high starting current of such a motor, which not only causes retardation, but also causes the parts making contact to be likewise loaded with a high current. The constant repetition of the contact making operation required for switching the motor on and off while a high current prevails, causes a powerful formation of sparks to arise. In this connection it further wants to be taken into account that the making of the contact by the float, or the like, acted upon by the gas pressure, will be primarily effected by the contacts being but very slightly pressed against each other, with the result that the proper contact making action is decidedly impaired by the large intermediate resistances prevailing.

My present invention is based on the idea of rendering such a retardation, which would form the basis for lagging, and hence for a super- or subsensitive regulation with all their drawbacks, impossible, by the said regulation not being effected during the transition of the parts from the state of rest into that of motion, but in that the said regulation is carried out while the parts are already in motion, the degree of the regulation being moreover made dependent only upon the alterations occurring during this state of motion. This measure is grounded upon the recognition of the fact that here all the parts are already in motion, so that alterations or changes may be more readily effected than when they are passing over from the position of rest into that of motion, and vice versa. In connection herewith, the far smaller coefficient of friction of the movement as compared with that of the state of rest, as also the much smaller change which the electrical conditions are subject to relatively to the supply of starting current required, play a very important part.

Now to enable this to be done, the flow of gas or liquid is throttled, according to my present invention, by means of a rotary device of some suitable kind, the velocity of which is again made either directly or indirectly dependent upon the gas or liquid flow. The peculiar manner of carrying this idea into practical effect is characterized by the feature of there being employed two rotary devices, of which the one is adapted to run with constant speed, while the speed of the other is altered by the flow of gas about to be throttled. By the angular displacement of these two rotary devices relatively to each other, in other words, by their relative movement, the throttled area for the gas will be so affected that, on the second rotary device increasing its speed, the said area will be decreased, and on said device running at slow speed, it will be increased.

The rotary device with constant movement may be of any construction desired, and may consist say of a clock-work or an electric motor having a constantly uniform velocity. The movement of the second rotary device may be directly acted upon, in that it is constructed in the manner of a gas-meter, or as a kind of turbine driven by gas, or else indirectly in that the electric motor constituting this said second rotary device is suitably controlled by an adjusting or setting arrangement acted upon by the gas pressure. In a similar manner, the alteration of the throttling area may be effected either directly or else indirectly; directly, by either two disc-shaped bodies which are oppositely disposed or by two bodies cooperating with one another and provided with suitable openings, such bodies being displaced relatively to each other by the two rotary devices; indirectly, by the said two rotary devices driving a differential gear which, by the algebraic sum of movements, effects a displacement of the throttling device within the stationary tubing in the one or other direction.

Owing to the absence of large masses, and to the advantage, hereinbefore already explained, of the regulating action being made dependent upon a change effected while the parts are in a state of movement, a device of this kind is distinguished by its very extreme sensitiveness, without being for that reason sensitive as regards interruptions of service. When undertaking to exactly regulate small quantities of gas, such as are required for that purpose, it will moreover be found that the fact of the throttled area being directly altered is of great consequence, whereas, when regulating large quantities of gas, such as are used for manufacturing purposes, it will be seen that a considerable regulating power may be obtained without this increase itself necessitating the expenditure of a considerable working capacity. The sensitive intermediate relays employed in the devices hitherto in use, and worked by motors are entirely dispensed with, as the two rotary devices, which are displaced relatively to each other, are adapted to act in the manner of such a relay.

Various modifications of devices embodying the principal ideas of my invention are shown by way of example in the accompanying drawings, in which—

Figs. 1 and 2 are an elevation, partly in section, and a cross section, respectively, of what may be termed the fundamental form of a device according to my invention and which might readily be employed for test purposes.

Fig. 3 is a longitudinal section showing a modified means for regulating the throttling area.

Figs. 4, 5, and 6 are a longitudinal section, a cross section, and an elevation, respectively, of a further modification.

Figs. 7, 8 and 9, are a cross section and longitudinal sections, respectively, of a form of execution of the improved device, such as will be required for regulating large quantities of gas for technical purposes.

Fig. 10 is an elevation showing a specially suitable form of regulation or governing by means of a float;

Fig. 11 is a diagrammatic view of a form of application of the improved device for regulating the drawing off of gases in connection with coke ovens, or the like.

Referring to the drawings, the device shown in Figs. 1 and 2 corresponds to the simplest that may be devised, in which, for example, the one of the rotary devices is in the shape of a clock work, while the other constitutes a gas-meter or other rotary device directly acted upon by the gas current. The alteration of the throttling area is in this case likewise effected directly. Within the cylinder 10 there are arranged so as to rotate easily pistons 11 and 12, along with their shafts 13 and 14. In each of said pistons there is formed a slot 15, 16 respectively (Fig. 2) which two slots when in their position of rest are exactly superposed. Shaft 14 is connected to a clock work 17, or the like, whence it obtains a certain definite velocity. Shaft 13, and hence piston 11, are set in motion by the current of gas or liquid about to be regulated, in that they are connected to the rotary device acted upon thereby, as a result of which piston 11 is also put in rotation. By employing a gas-meter, or the like, the velocity is made dependent upon the amount of gas which traverses the apparatus, whereby an accurate measurement is obtained which in particular is entirely free from any influence which the specific gravity might otherwise be apt to exert.

The gas enters at 18 into the gas-meter 19 and flows thence, as shown in Fig. 1, to piston 11. Now in order to be able to again escape at 20, the gas current must traverse slots 15, 16 of the pistons. Let it now be assumed that the speed accorded to the gas-meter 19 by the gas current shall correspond to that of the rotary device 17. In such a contingency the two pistons will revolve with equal angular velocity, as a result of which the slots wil remain exactly superposed even when in motion. However, as soon as the gas pressure and hence the velocity of the gas-meter 19 is increased, piston 11 endeavours to advance and thus cut off a section of the passage. This continues until the velocity of the gas-meter 19 is again in consonance with that of the rotary device 17.

If, for example, the gas pressure in their initial position happened to be very low, then, as a consequence the displacement of the two pistons will have been such that the slots would be exactly superposed so that their openings are in register. However, in proportion as the pressure constantly continues to increase, the opening in the slot is gradually caused to contract more and more as the gas-meter piston advances. As a result, the gas-meter steadily slows down till the state of rest has again been attained, i. e. until the gas current is throttled to such a degree that it will be able to accord the gas-meter a velocity corresponding to that of the piston 12.

It is obvious that in a device of the aforesaid description only a certain, definite quantity of gas, which is dependent upon the velocity of the piston 11, will be admitted; and for photometric purposes this will be entirely adequate. In the case of laboratory work, however, it will prove desirable to be able to regulate any desired quantity of gas, whatsoever. To this end, all that need be done is to alter the velocity of the rotary device 17, so that, in correspondence with the somewhat greater velocity on the part of piston 12, there will also be admitted a larger quantity of gas, or on the contrary, on the velocity of piston 12 being reduced, only a smaller quantity thereof.

The explanation for this is the following: Let it be assumed that the lowest quantity of gas to be regulated by the device per hour amount to about 20 litres. At this rate of speed for the gas, the gas-meter will rotate but very slowly. If now, however, the clockwork be likewise set to this velocity, so that the openings of the slots in the two pistons are so superposed as to register completely, then the quantity of the gas current traversing the device will for the moment be considerably more than 20 litres, and, as a result, it will drive the gas-meter with a greater velocity than that of the rotary device 17. This will cause the piston 11 to advance, and thereby to reduce the cross sectional area. The gas current now becomes smaller and smaller until it has been so far throttled that the gas-meter 19 will run at the rate of speed corresponding to 20 litres per hour, in other words, until the gas-meter has attained the velocity of the rotary device 17. If it be desired to obtain a larger quantity of gas, then the transmission for the rotary device 17 is suitably adjusted, as a result of which the shaft of piston 12 obtains an increased speed. Seeing, however, that the gas-meter up till now operates at a velocity corresponding to 20 litres per hour, the piston 12 will advance, or piston 11 will lag behind. By these means again the cross sectional area will be increased until the gas current becomes so large that the velocity of the gas-meter will be again in consonance with that of the clock-work 17. Instead of altering the transmission of the latter, it is obvious that also that of the gas-meter may be changed if thought more expedient.

In a like manner, the construction of the governor or regulating device may be modified in manifold ways. Should circumstances suggest it as expedient, there may also be employed a conical valve adapted to be shut to a greater or smaller extent by a transmission of the rotary movement. A form of execution of this kind is shown in Fig. 3, in cross section. In this construction the casing 10 is divided by means of a central partition 21 into two sections into which terminate the gas connections 18 and 20. On the shaft 13, driven by the one of the two rotary devices, the cone 22 is arranged to move within a bore formed in the partition 21, this said cone being taken along by shaft 13 as it rotates, while at the same time it admits of shift in a longitudinal direction. This is facilitated by the cone 22 engaging a pin 24, fixed on shaft 13, by means of a slot 23. The end of the shaft 14 is provided with a thread 15 adapted to engage a corresponding female thread formed in the cone 22. On the two rotary devices being displaced relatively to each other the cone 22 is therefore either rotated forward or backward, whereby the passage for the gas, or the like, is suitably throttled.

In the hereinbefore described arrangement, only the very slight friction caused by the bearing of the small piston 11 need be taken into account, and as the said piston is indirectly connected to the shaft of the gas-meter, this latter will only be required to supply an extremely small amount of power for rotating the said small piston, which power may for all practical purposes be entirely disregarded.

What is important is that the same gas or liquid current which is more or less powerfully throttled for the purpose of regulating the final pressure shall at the same time also be caused to either directly or indirectly influence the rate of speed of that one of the two rotary devices which serves to assist this throttling operation. In this manner there is also secured during the advance of this said rotary device at increased pressure on the part of the gas current an augmentation of its load by means of the throttling action, in other words the advance is properly limited while, at the same time, no considerable reactions will arise in the throttling device itself which might in any way tend to impair the ease of its play. Now the physico-chemical process herein involved may be assumed to be the following. The rotary device driven by the gas or liquid current operates, relatively to the pressures prevailing in front and to the rear, always in a certain state of inertia corresponding to a definite rate of speed. On the pressure in front of the rotary device undergoing a change, then also, along with a slight alteration of speed on the part of the rotary device, the pressure prevailing to the rear of the rotary device will be changed to such an extent that a new state of inertia will be created corresponding to a displacement of the rotary device for a definite angle relatively to the initial position.

In the modification disclosed in Figs. 4, 5, and 6, the rotary device, which is adapted to run at a constant uniform speed, is replaced by an electromotor. On the other hand, there exists the further fundamental difference between this modified form and the one just described that the second rotary device is now no longer directly but only indirectly acted upon by the gas current, whereas the feature of directly governing the cross sectional throttling area by displacing the two rotary devices relatively to each other is still retained. In this modified form, the shaft 14 is connected to the electromotor 27 and adapted to constantly run at the same rate of speed. The shaft 13 is connected to the electromotor 26, the speed of which may be changed by the contact device shown in Fig. 6. To the float 28 there is fixed an insulating block 29 supporting the spring 30 and the contact 31. Above said spring there is arranged a contact 32, and below it a stop 33. The contact making members 32, 30, 31 communicate by means of the resistances 34, 35 and 36 with the rotor terminals 37, 38 and 39 of the three-phase motor 26 which is provided with a slip ring armature. In the position illustrated in Fig. 6, a definite resistance is assumed as being connected into the rotor circuit, so that the three-phase motor will in this case run at a somewhat lower speed than under normal conditions. The electromotor 26 is enabled to adapt itself to this low rate of speed by means of series resistances, so that both these two electromotors 26, 27 will run at exactly the same angular velocity when the float assumes the position shown. By these means, the free section of the slots running through pistons 11 and 12 remains unchanged. The float communicates with the main piping by means of the pipe 40. In the position of rest in which the float is shown in the drawing, the buoyancy displayed corresponds to the weight of the float.

On the pressure increasing, and the float thereby rising, the spring 30 will make contact with the member 32, and will thus short-circuit the resistance 34, as a result of which the speed of motor 26 will slightly increase. The consequence will be that piston 11 will slightly advance and thus reduce the cross sectional area of the slot openings. This will continue until the weight and the buoyancy of the float have again been balanced. If, on the contrary, the gas pressure drops, so that the float will be caused to sink, then spring 30 will bear against the stop 33, whereby the contact between parts 30 and 31 will be broken. Resistance 36 will, as a result, be cut out, and the speed of motor 26 be thereby reduced. This will cause piston 11 to lag and the cross sectional area of the slot openings will be again enlarged.

The advantage of this arrangement resides in the fact that but a very slight alteration of speed will suffice to influence the gas current. For this reason, the pressure existing between contacts 30, 32 and 31 while the contact is broken, will be but extremely slight, in particular because the motor is not switched on or off by this interruption of contact, but is merely affected as regards its speed. It is thus a feature of importance that in this case, contrary to former arrangements, the circuits are not opened or closed, but merely altered with regard to their resistance.

Now by this arrangement there is for one thing obtained the advantage of the regulation being rendered extremely sensitive, since a very small float may be employed, and also, in view of the fact that by reason of the extremely slight passage of current, the making of the contact will constantly be good and satisfactory. The starting current, which in the case of other governors makes itself disagreeably felt and which always causes the motor to start with a jerk, is by no means liable to be felt in this case since all that is required is that the two motors shall continue to run perfectly smoothly, i. e. without a hitch.

The modification illustrated in Figs. 7, 8, 9 illustrates besides the indirect action of the gas current about to be regulated on one of the two rotary devices, in addition the indirect alteration of the throttling area itself. An arrangement of this kind will be specially suitable for the construction of large gas pressure regulators, because in such cases it is practically almost impossible to produce cross sections of as large a dimension as required that may be directly controlled by the rotary devices. For this reason there must in this case be employed a special throttling device, say, in the form of a standard slide valve, fitted into the stationary piping. This valve will then be operated in the following manner: The two electromotors 26 and 27, serving for the governing action, are connected by the extremities 13 and 14 of their shafts and by means of a coupling 41 to a differential gear, the well known arrangement of which is disclosed in Figs. 7 and 8. The wheels 44 of the differential are mounted on the two motor spindles, which, wheels mesh with two rotatable pinions 45 and 46, adapted to rotate with their radial axes. The pivots of said pinions are lodged in the bevel wheel 47 engaging a second bevel wheel 14, serving to drive shaft 49.

Seeing that the two motors 26 and 27 are running in opposite directions, there is produced the well-known effect that when the speed of both motors remains the same, bevel wheel 47 will remain stationary; whereas, on the angular velocity of the one or the other of the two electromotors either diminishing or increasing, bevel wheel 47, and therewith spindle 49, will be caused to rotate either to the right or left. The speed of one of the two electromotors may be slackened or accelerated by means of a contact device disposed on the float 28, freely suspended within the receptacle 42 (Fig. 9). The float is acted upon by the delivery pipe 40 connected at the rear of the cylindrical slide valve 50, shown in Fig. 7, to the gas piping to be governed. The line 43 communicates with the slip ring armature of the three-phase motor 26. On the gas pressure increasing, the contact rod 30, attached to the insulating member 29 (Fig. 9), by making contact with the member 32, short-circuits the resistance 34, in consequence of which motor 27 will advance, and thus cause a corresponding rotation of bevel wheel 47. On the gas pressure sinking, and as soon as the contact rod 30 makes contact with the stop 33, contact 31 is opened and the auxiliary resistance 36, connected in parallel to the resistance 35, is cut out, so that motor 22 will slacken its speed, and the bevel wheel 15 be caused to move in the opposite direction. By these means shaft 49, and the rotary slide valve 50 (or throttle valve) connected by a chain, or otherwise, to the chain wheel 51, will be suitably displaced. In order to produce a definite gas pressure, the float 28 is correspondingly loaded.

In practice, the possibility must be taken into account that the gas pressure will sink to such an extent that the governor will entirely open the rotary slide valve; provision must therefore be made that in such a case, while the slide valve is wide open, the device will not stick. It is moreover possible that, owing to an interruption of service, the gas pressure may entirely fail, so that, on a fresh supply of gas being admitted, this will flow forward to the points of consumption owing to the slide valve being wide open, a fact which, under certain circumstances and as experience has shown, may be the cause of explosions. Now to prevent any such contingency, the improved governor is in addition intended to completely shut off the piping and to bring itself to a stop in such wise that it first has to be put in operation again by hand, the moment the gas pressure fails to assert itself.

The manner of operation of this modified construction is as follows: On the shaft 49 there is mounted a short tapped member 52, adapted to shift the sleeve 53 in either direction, which sleeve for its part is secured against rotation. On the gas pressure dropping, the float 28 (Fig. 9) sinks, and on contact being made with the stop 33, contact 31 is opened, so that the motor will be caused to slacken its speed. By these means, as already set forth, the bevel wheel 47, and therewith the shaft 49, are brought into rotation, and the rotary slide valve 50 is opened correspondingly further. Simultaneously as the shaft 49 begins to revolve, the sleeve 53 is shifted outwards, and, in the event of the gas pressure continuing to sink so that the said slide valve is entirely open, the sleeve 53 will come to bear against the chain wheel 51. This wheel is mounted loosely on the shaft 49 and is maintained in engagement by the compression spring 54 by means of a slot, formed in the hub, with a pin 55, traversing the shaft 49, and is in this way caused to follow the rotary motion of said shaft. On the rotary slide valve being opened until its terminal position has been attained, then the sleeve 53 is shifted more and more outward, until it finally comes to bear against the chain wheel 51, thereby bringing the pin out of engagement with the slot in the hub, and thus causing the chain wheel 51 to stand still.

In the event of the gas failing entirely, while the slide valve is in the aforesaid position, then, on a fresh supply of gas being admitted, the said valve will obviously be inadmissibly wide open. Now in order to render it possible, to completely shut down the rotary slide valve in the event of the gas pressure failing entirely, there is provided an additional float 56 (Fig. 9), which is likewise freely suspended within a receptacle 57. This second float is subject to the action of the delivery pipe 58 which, in contradistinction to pipe 40, terminates to the front of rotary slide valve 50 in the main gas piping. The said float supports a contact bar 59. On the gas pressure failing entirely, the float 56 sinks, and in sinking touches by means of bar 59 the two contacts 60 and 61, thereby short-circuiting the resistances 34 and 35. This causes the speed of motor 27 to be considerably accelerated, as a result of which the shaft 49 is rotated in the opposite direction. The sleeve 53 is now again retracted, the chain wheel 51, acted upon by spring 54, again effects engagement with the pin 55, and thus finally closes the rotary slide valve.

If the rotary slide valve now assumes its other terminal position, at which the piping is entirely closed, then the setting screw 62 will again come to bear against the lever 63, which latter is adapted to secure the switch 65, which is acted upon by a tension spring 64, by means of a projection 66. As soon as the setting screw 62 bears against the lever 63, the spring 64 withdraws the switch 65, whereby the supply for both motors is cut off. The governor has now come to a standstill, and can only be put in operation again after the switch 65 has been returned into its initial position by hand; the special additional object the improved device is intended to accomplish is thus fulfilled.

In practice a further improvement has been found highly useful, and which consists of the following: On powerful resistances arising in the throttling device there may also arise the possibility, in the event of the speed of the one motor being altered, of this said motor seriously affecting the rotary movement of the other motor by means of the pinions momentarily secured owing to the said resistances which have to be overcome.

Now such a contingency is rendered impossible, by interposing self-locking transmission gear, such as worm gear or the like, between the electromotors and the differential gear. On these means being resorted to it will no longer be possible for the one motor to displace the other motor by aid of the differential gear remaining stationary, because a movement can only be effected by bringing the worm wheel gear into rotation from the side of the motor appertaining thereto. Practical experience has moreover shown the expediency of still further amplifying the construction by the provision of a damping device for the contact arrangement proper. This may be done, for example by all the contacts being arranged on a lever resembling a balance lever, and which on its one end is acted upon by a float 28, while at the other it is connected to a second and similar float, the gas space of which is provided with a piping communicating with the atmosphere, and into which a throttling valve is interconnected. Now, according to whether this valve be opened to a greater or less extent, there is afforded the possibility of throttling the compensating air to a larger or smaller degree, and consequently of producing thereby a corresponding damping action.

On the electric current failing for the two motors, it will be found expedient, according to the special purpose for which the device is intended to be used to either shut off the closing device arranged in the piping, or else to open it entirely. This may be effected in a particularly simple manner by a brake pulley being arranged on the shaft of one of the two electromotors, the brake blocks of which are raised by an electromagnet while there is current. The moment the current fails, the brake enters into action, as a result of which, while the other motor, which is not subject to brake action, lags, the differential gear is caused to move. Thus, according to whether the one or the other of the two electromotors be braked in the manner indicated, the closing device (float, rotary slide valve or other), may either be opened or closed.

Similarly, the actual governing device may still further be improved. For example, in order to be able to adjust the device to correspond to various predetermined gas pressures, there will primarily have to be taken into account the possibility of loading the float with different weight. As, however, owing to the inertia of the masses, the sensitivity of the device will thereby suffer, it will be advisable primarily to substitute a spring load for a load by weights, and this one capable of being adjusted in conformity with the predetermined gas pressure to be obtained. In view of the fact that, when employing a spring of the said kind, there will be practically speaking no reaction of the masses, the sensitivity of the device will in no way be lessened or impaired.

It will, however, be found that the special modification disclosed in Fig. 10 will be particularly suitable for the said purpose. In this case use is made, in the place of the bulb 28, of a regular closed float 67, arranged to move up and down within the receptacle 42, and which is connected by means of the threaded member 68 in such a manner with the contact lever 69, that its relative position thereto may be altered. The receptacle 42 communicates by means of a piping 70 with a second closed receptacle 71 subjected to the gas pressure through the piping 40. The two receptacles 42 and 71 are filled with a sealing liquid, and thus form what are known as communicating vessels, in the case of which, on the pressure being balanced, the level of the liquid in either vessel will be equal. If now the liquid contained within the vessel 71 be placed under pressure, then the level of the liquid in vessel 42 will rise and will take the float 67 along. Now, by adjusting the threaded members 68, the relative central position of the float 67 with regard to the contact lever 69 can be predetermined; in other words, the successful operation or working of the governing device at definite, different pressures, will be obtained.

Retrospection will by the way lead to the interesting conclusion that also the device disclosed in Fig. 3 actually represents a real differential. For inasmuch as the set of tapped members 22, 25 is adapted to be screwed down by the one rotary device (or motor), and screwed off by the other rotary device (or motor), a differential movement will be secured corresponding to the difference in the speed of the two rotary devices (or motors). There is thus produced a threaded differential. However, instead of directly acting thereby on the conical member 22, the possibility is furthermore afforded of governing a special closing device, arranged at the stationary gas piping, by means of a suitable lever, in full accordance with the form of construction illustrated in Figs. 7 and 8.

Practical experience has moreover shown that on employing two electromotors 26, 27 it will prove expedient not to let the one motor run constantly and to control only the other, but to control both. For inasmuch as both motors 26, 27 are acted upon contrariwise, that is, the speed of the one being accelerated while that of the other is slackened, there will be secured a twofold useful deflection for one and the same change of speed.

In the modification shown in Fig. 11, the gas or liquid current does not, as was hitherto the case, so to say govern itself, but acts on the supply of energy for the driving engine of the gas suction apparatus. By these means, while retaining all the advantages of the device heretofore indicated there will be afforded the possibility of nicely or most accurately regulating the drawing off of the gases, a fact of the very greatest importance in connection, say, for example, with a range of coke ovens in the case of which it is desirable to maintain to utmost possibility a certain definite pressure within the gas collecting pipe or what is known as the hydraulic main.

The hydraulic main 72, adapted to collect the gases of a coke oven, or the like, communicates by a piping 73 with the gas suction fan 74 which forces the gas through piping 75 onward to the points of consumption. By means of a connecting tube 40, the gas pressure within the main 72 is caused to act on the float 28, controlling the contacts 32 and 33 of the motor 27, whereby the resistance, and therewith the speed of this latter is affected. A disc 12, bearing up against a second disc 11 of suitable shape and moving after the manner of a piston within the casing 10, is caused to rotate by motor 27. Disc 11 is driven by motor 26 running with constant speed, or else controlled contrariwise to motor 27. By these means the openings 15 and 16 formed in the flat pistons 11 and 12 will be placed in consonance to a greater or less extent.

Hereupon, the steam which, after flowing from boiler 76 through joint 77 into casing 10, passes out again through pipe 20, is more or less throttled, and by these means the driving engine 78 of the suction fan is enabled to run with a suitable admission.

While the steam is thus throttled, the engine 78 will run either faster or slower, whereby a proper dependency of the gas supply from the pressure is created. Inasmuch as the unit consisting of the suction fan 74 and the driving engine 78 merely constitutes an additional auxiliary device for regulating the gas pressure, the installation shown in Fig. 11 merely represents a further form of indirect control. The arrangement indicated is merely intended to serve as an example, as will be readily understood, as the same idea may also be carried out in a different way, as for example, by driving the suction fan by electricity or by turbines.

In practice it will be frequently found necessary that different governors cooperating in a common system of pipes shall be so adjusted that primarily those places or points of consumption which are the most important for the service will obtain a predetermined gas pressure, and only after this has been secured, the next following governor will open the second point or place of consumption, and, should the pressure prove adequate, then the third governor will open a third, and so on. On the contrary, the third governor must be the first to shut down the closing device, on the predetermined pressure not being any longer attained, while as the pressure continues to drop, also the second governor may enter into action, etc. This successive opening and shutting down operation is effected by an additional float, similar to the one shown in Fig. 9, in that these additional floats, which may suitably be styled reversing floats, be provided with different loads. Thus the various reversing floats may be so adjusted relatively to each other that the first will enter into action, say, at a pressure of 30 mm., the second at one of 40 mm., the third at a pressure of 50 mm., and so on.

I claim:

1. The method which consists in utilizing the variable pressure prevailing in a gas or liquid current for influencing the speed of a rotary device adapted to throttle the flow of said current in proportion as the speed of said device varies.

2. The method which consists in utilizing the variable pressure prevailing in a gas or liquid current for influencing the relative speeds of two rotary devices adapted to jointly throttle the flow of said current in proportion as their speeds differ.

3. In a device of the kind described in combination, a rotary device adapted to be influenced by variations of pressure in a gas or liquid current and means for throttling said current adapted to be actuated by said rotary device.

4. In a device of the kind described in combination, two rotary devices adapted to rotate at equal speed, one of said devices being adapted to be influenced by variations of pressure in a gas or liquid current and means adapted to be actuated by the said devices for throttling said current.

5. In a device of the kind described in combination two rotary devices adapted to rotate at equal speed, means adapted to be actuated by the said devices for throttling said current whenever the said devices are running at different speeds and means for causing variations of pressure in a gas or liquid current to influence the speed of one of said devices.

6. In a device of the kind described in combination two rotary devices adapted to rotate at equal speed, a valve inserted in a gas or liquid current connected with the said devices and adapted to exert a throttling effect whenever the said devices are running at different speeds and means actuated by variations of pressure in said current for influencing the speed of one of said devices.

7. In a device of the kind described in combination two rotary devices, one of them being an electromotor adapted to rotate at equal speed, a valve inserted in a gas or liquid current connected with the said devices and adapted to exert a throttling effect whenever the said devices are running at different speeds and means actuated by variations of pressure in said current for influencing the speed of said electromotor.

8. In a device of the kind described in combination two rotary devices, one of them being an electromotor adapted to rotate at equal speed, a float adapted to be influenced by a gas or liquid current, electric means adapted to be actuated by said float for altering the working conditions of said electromotor and a valve inserted in said current and adapted to be operated whenever the speed of said electromotor differs from that of the other rotary device.

9. In a device of the kind described in combination two electromotors adapted to rotate at equal speed, a float adapted to be influenced by a gas or liquid current, electric means adapted to be actuated by said float for altering the working conditions of at least one of said electromotors and a valve inserted in said current and adapted to be operated, whenever the two motors are running at different speeds.

10. In a device of the kind described in combination two electromotors adapted to rotate at equal speed, a float adapted to be influenced by a gas or liquid current, electric means adapted to be actuated by said float for altering the working conditions of one of said electromotors by mere variation of resistance and a valve inserted in said current and adapted to be operated whenever the speed of said electromotor differs from that of the other rotary device.

11. In a device of the kind described in combination, two electromotors adapted to rotate at equal speed, a float adapted to be influenced by a gas or liquid current, electric means adapted to be actuated by said float for altering the working conditions of at least one of said electromotors, a differential gear connecting the said electromotors and a valve inserted in said current and operatively connected to said differential gear.

12. In a device of the kind described in combination, two electromotors adapted to rotate at equal speed, a float adapted to be influenced by a gas or liquid current, electric means adapted to be actuated by said float for altering the working conditions of the said electromotors in an opposite sense, a differential gear connecting the said electromotors and a valve inserted in said current and operatively connected to said differential gear.

13. In a device of the kind described in combination, two electromotors adapted to rotate at equal speed, a float adapted to be influenced by a gas or liquid current, electric means adapted to be actuated by said float for altering the working conditions of the said electromotors in an opposite sense, a differential gear connecting the said electromotors, a valve inserted in said current and operatively connected to said differential gear and means for automatically severing the connection between said valve and the mechanism actuating it, whenever said valve has reached its extreme opening position.

14. In a device of the kind described in combination, two electromotors adapted to rotate at equal speed, a float adapted to be influenced by a gas or liquid current, electric means adapted to be actuated by said float for altering the working conditions of the said electromotors in an opposite sense, a differential gear connecting the said electromotors, a valve inserted in said current and operatively connected to said differential gear, means for automatically severing the connection between said valve and the mechanism actuating it, whenever said valve has reached its extreme opening position and means for automatically cutting out the supply of electrical energy, whenever said valve is entirely closed.

15. In a device of the kind described in combination, two electromotors adapted to rotate at equal speed, a float adapted to be influenced by a gas or liquid current, electric means adapted to be actuated by said float for altering the working conditions of said electromotors, a differential gear connecting the said electromotors, a valve inserted in said current and operatively connected to said differential gear, and a brake adapted to act on one of said motors, whenever the supply of electrical energy is interrupted.

In testimony whereof I affix my signature.

JOSEF HEINZ REINEKE.